United States Patent
McKey, III

(10) Patent No.: US 9,630,684 B2
(45) Date of Patent: Apr. 25, 2017

(54) METHOD AND SYSTEM OF A CONTROLLABLE TAIL BUOY

(71) Applicant: PGS Geophysical AS, Oslo (NO)

(72) Inventor: Troy L. McKey, III, La Place, LA (US)

(73) Assignee: PGS Geophysical AS, Oslo (NO)

( * ) Notice: Subject to any disclaimer, the term of this patent is extended or adjusted under 35 U.S.C. 154(b) by 33 days.

(21) Appl. No.: 14/812,089

(22) Filed: Jul. 29, 2015

(65) Prior Publication Data

US 2015/0331129 A1 Nov. 19, 2015

Related U.S. Application Data

(62) Division of application No. 13/198,805, filed on Aug. 5, 2011, now Pat. No. 9,126,661.

(51) Int. Cl.
| | |
|---|---|
| *G01V 1/38* | (2006.01) |
| *B63B 22/20* | (2006.01) |
| *B63B 21/66* | (2006.01) |
| *B63B 22/00* | (2006.01) |

(52) U.S. Cl.
CPC .............. *B63B 21/66* (2013.01); *B63B 22/20* (2013.01); *G01V 1/3808* (2013.01); *G01V 1/3826* (2013.01); *B63B 2022/006* (2013.01)

(58) Field of Classification Search
CPC ... B63B 21/66; B63B 22/20; B63B 2022/006; G01V 1/3826; G01V 1/3808
USPC ................................................ 367/17; 441/2
See application file for complete search history.

(56) References Cited

U.S. PATENT DOCUMENTS

| | | | |
|---|---|---|---|
| 3,560,912 A | 2/1971 | Spink et al. | |
| 4,350,111 A | 9/1982 | Boyce, II | |
| 4,890,568 A | 1/1990 | Dolengowski | |
| 5,616,059 A | 4/1997 | Solomon | |
| 6,142,092 A | 11/2000 | Coupland | |
| 6,606,958 B1 | 8/2003 | Bouyoucos | |
| 7,222,579 B2 | 5/2007 | Hillesund et al. | |
| 2010/0226204 A1* | 9/2010 | Gagliardi | G01V 1/38 367/16 |
| 2012/0134234 A1 | 5/2012 | Roberts | |

FOREIGN PATENT DOCUMENTS

| | | |
|---|---|---|
| EP | 2527880 A2 | 11/2012 |
| FR | 2032323 A1 | 9/1999 |
| GB | 2335174 A | 9/1999 |

(Continued)

OTHER PUBLICATIONS

Conor McMichael, United Kingdom Search Report, Date of Mailing: Nov. 20, 2012.

(Continued)

*Primary Examiner* — Daniel L Murphy

(57) ABSTRACT

Controllable tail buoy. At least some of the illustrative embodiments are methods including: towing a sensor streamer and tail buoy through water, the sensor streamer defining a proximal end and a distal end with the tail buoy coupled to the distal end, and the towing with the sensor streamer and the tail buoy submerged; and during the towing controlling depth of the distal end of the sensor streamer at least in part by the tail buoy; and steering the distal end of the sensor streamer at least in part by the tail buoy.

13 Claims, 5 Drawing Sheets

(56) References Cited

FOREIGN PATENT DOCUMENTS

GB          2342081 A    4/2000

OTHER PUBLICATIONS

UK Examination Report mailed Apr. 9, 2014, for patent application No. GB1213734.5, 4 pages.
Wikipedia. (n.d.) Underwater glider. Retrieved from http://en.wikipedia.org.wiki/Underwater_glider on May 31, 2011.
Preliminary Search Report from French Patent Office in FR application No. FR 1257561, the Preliminary Search Report issued Sep. 8, 2014.

* cited by examiner

METHOD AND SYSTEM OF A CONTROLLABLE TAIL BUOY

CROSS-REFERENCE TO RELATED APPLICATIONS

This application is a divisional of and claims priority under 35 U.S.C. §120 to U.S. patent application Ser. No. 13/198,805 filed Aug. 5, 2011 titled "Method and System of a Controllable Tail Buoy," which is incorporated by reference herein as if reproduced in full below.

BACKGROUND

Marine survey systems are used to acquire data (e.g., seismic, electromagnetic) regarding Earth formations below a body of water such as a lake or ocean. The marine survey systems comprise a complex array of buoys, lines, and paravane systems in order to properly orient streamers towed behind the survey vessel.

Weather and related sea conditions may adversely affect the ability to perform a marine survey. In adverse weather conditions, the surface waves may induce noise in the signals detected by the underwater streamers by way of the surface buoys associated with the streamers. Moreover, surface obstacles, such as ships, may interfere with the surface buoys.

BRIEF DESCRIPTION OF THE DRAWINGS

For a detailed description of exemplary embodiments, reference will now be made to the accompanying drawings in which.

NOTATION AND NOMENCLATURE

Figure 1:
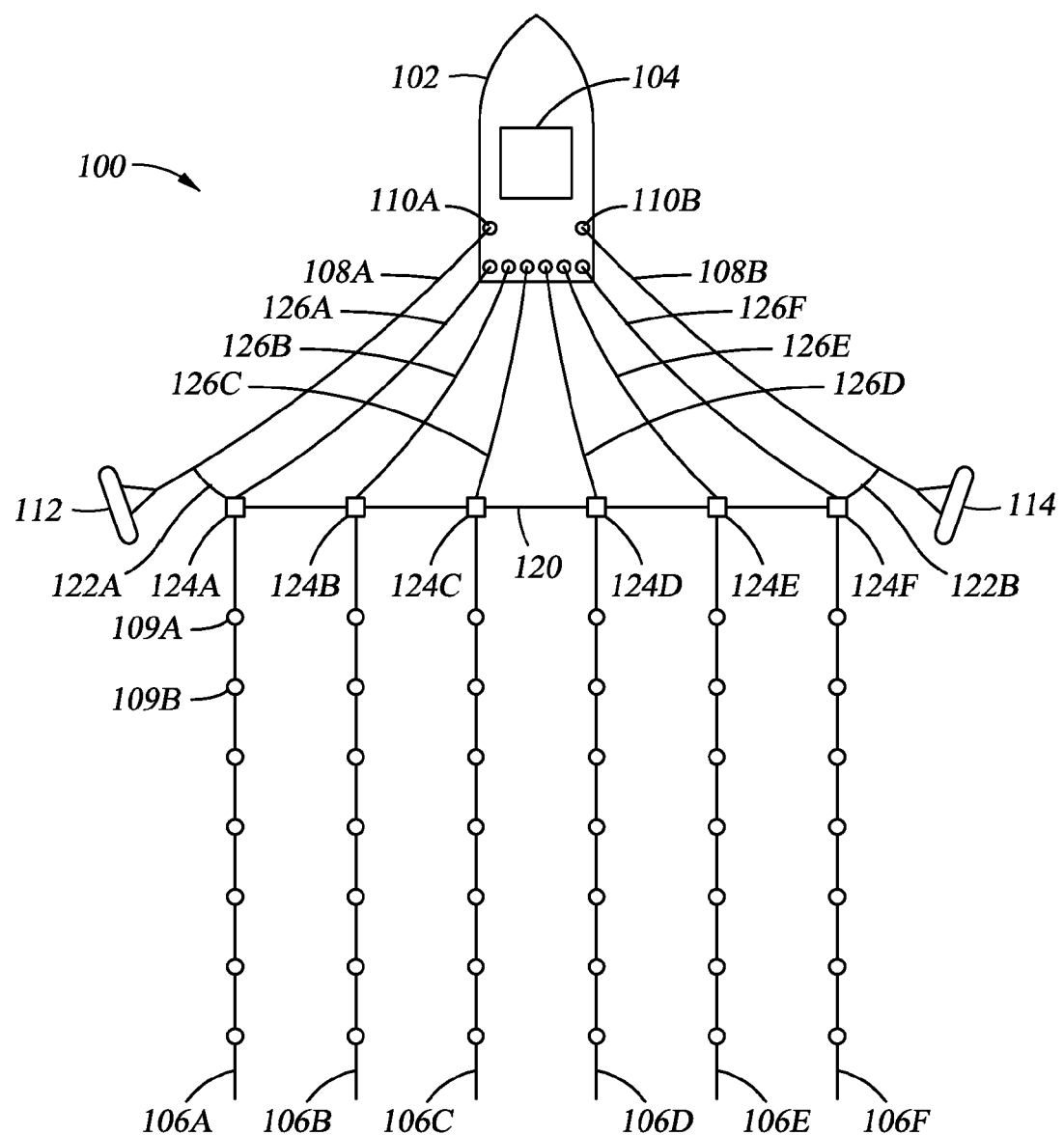
FIG. 1 shows an overhead view of a marine survey in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Submerged" shall mean that an object resides fully below the surface of the water. If any portion of the object resides above the surface, then the object shall not be considered submerged. "Submerges" shall mean that an object becomes submerged.

"Buoyancy" of an object shall refer to buoyancy of the object taking into account any weight supported by the object.

"Chord" shall mean an imaginary straight line joining a leading edge and a trailing edge of a surface along the direction of travel when in use in a marine survey.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various embodiments are directed to a tail buoy for streamers towed behind a survey vessel during a marine survey. More particularly, the various embodiments are directed to a tail buoy where the tail buoy may be selectively submerged, thus reducing the amount of movement of the buoy caused by surface chop and avoiding surface obstacles. In at least some embodiments the tail buoy also steers the distal end of the sensor streamers (e.g., to help avoid entanglement with other sensor streamers). Moreover, a tail buoy in accordance with at least some embodiments may be "instrumented" to contain a variety of electrical and/or electromechanical instruments directly or indirectly useful in conducting marine surveys. The specification first turns to an illustrative marine survey system, and then discusses tail buoys in accordance with various embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six streamers 106, any number of streamers 106 may be equivalently used.

The streamers 106 are coupled to towing equipment that maintains the streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The streamers 106 are each coupled, at the ends nearest the vessel 102 (i.e., the proximal ends) to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 109A, 109B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

Figure 2:
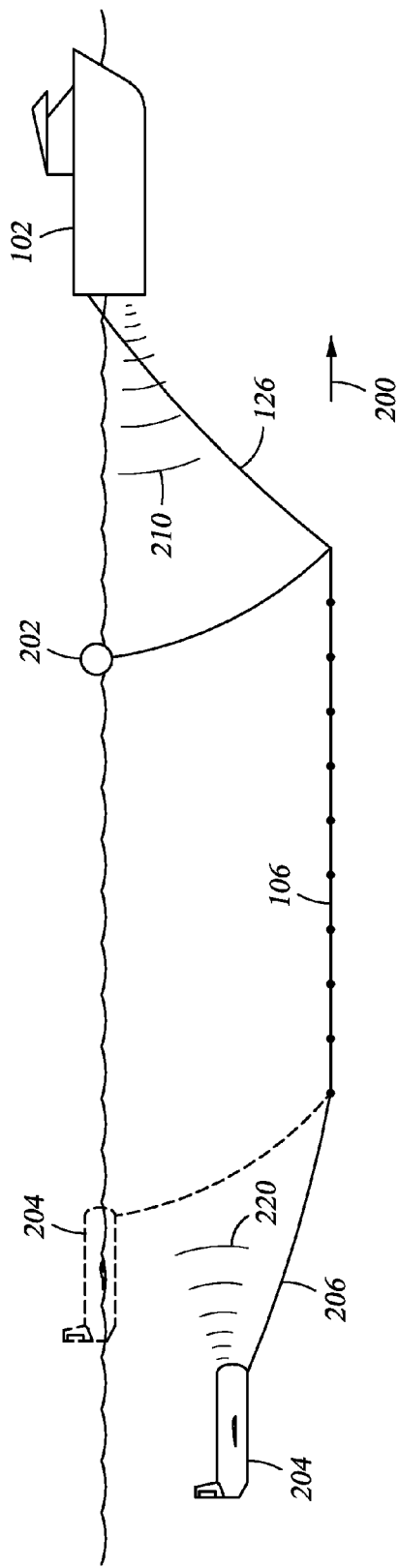
FIG. 2 shows a side elevation view of marine survey in accordance with at least some embodiments.

Although not shown in FIG. 1, each streamer 106A-F may be associated with one or more buoys. FIG. 2 shows a side elevation view of a streamer 106 in an operational configuration. In particular, FIG. 2 shows a streamer 106 being towed in a direction indicated by arrow 200 by tow vessel 102. In some embodiments, the forward portion of the streamer may be associated with a lead buoy 202, where lead buoy 202 may help maintain the depth of the streamer 106 and/or associated portion of the spreader line; however, in other cases the lead buoy 202 may be omitted, or other buoys (e.g., buoys associated with the spreader line 120 (not shown in FIG. 2) may perform similar functions. Although the streamer harness or bridle arrangement of FIG. 1 has been described for illustrative purposes, other arrangements may be used without deviating from the scope of the invention as described and claimed below.

FIG. 2 also illustrates a tail buoy 204. Tail buoy 204 may couple to the sensor streamer 106 by any suitable mechanism, such as line 206, sometimes referred as a "dead section". The line 206 may have any suitable length, and in some cases between 50 and 250 meters. Tail buoy 204 may serve several purposes. For example, when at the surface (shown in dashed lines) tail buoy 204 may serve as a visual indication of the location of the end of the streamer 106. In some cases, the tail buoy 204 may at least partially support the sensor streamer 106. In particular, the streamer 106 may be configured to be neutrally buoyant, or perhaps very slightly negatively buoyant depending on the salinity and temperature of the surrounding water. In a particular embodiment, each tail buoy 204 may provide support on the order of 30 kilograms or more to its attached sensor streamers. Other supported weights are possible. Thus, tail buoy 206 may help maintain the depth of the streamer 106.

However, being mechanically coupled to the streamer 106, when the tail buoy 204 is at the surface the tail buoy 204 may impart unwanted motion to the streamer 106, particularly in choppy seas. Such unwanted motion may result in noise in the signals detected by the sensors of the streamers. In order to reduce the amount of motion in the streamer 106 induced by the tail buoy 204, in accordance with various embodiments the tail buoy 204 may be selectively submerged. Operating the tail buoy submerged may expose the buoy to less surface chop, and may thus induce less noise in the readings taken by the sensor streamer 106. Moreover, the tail buoy 204 may be submerged to avoid obstacles, such as other ships, or sensor streamers (on the same or different marine survey systems). Even in the submerged state, the tail buoy 204 may at least partially support the sensor streamer 106.

The commands to cause the tail buoy 204 to submerge or surface may have many forms. In some embodiments, the tail buoy 204 is communicatively coupled to the tow vessel 102 by way of the lead-in cable 126, sensor streamer 106, and line 206 in the form of a cable. In yet still other embodiments, the tail buoy 204 may be communicatively coupled to a surface vessel (e.g., the tow vessel 102) by way of an acoustic communication system that utilizes the water as the communication medium. For example, in FIG. 2 the tow vessel 102 is illustrated to produce acoustic signals in the form of pressure waves 210 within the water. The pressure waves 210 propagate to and are received by the tail buoy 204. The pressure waves 210 may encode commands, like commands for the tail buoy 204 to submerge, or to submerge to a particular depth. Other commands are possible, such as commands regarding steering the distal end of the sensor streamer 106 (discussed more with respect FIG. 3). While in some cases the tail buoy 204 may be configured only to receive and implement commands, in other cases the tail buoy 204 may be capable of acoustically communicating with the other vessels (e.g., tow vessel 102), as illustrated by pressure waves 220 emanating from the tail buoy 204. In yet still other cases, the tail buoy 204 may be communicatively coupled by electromagnetic waves through air or water, such as satellite-based communications or locally broadcast signals.

Figure 3:
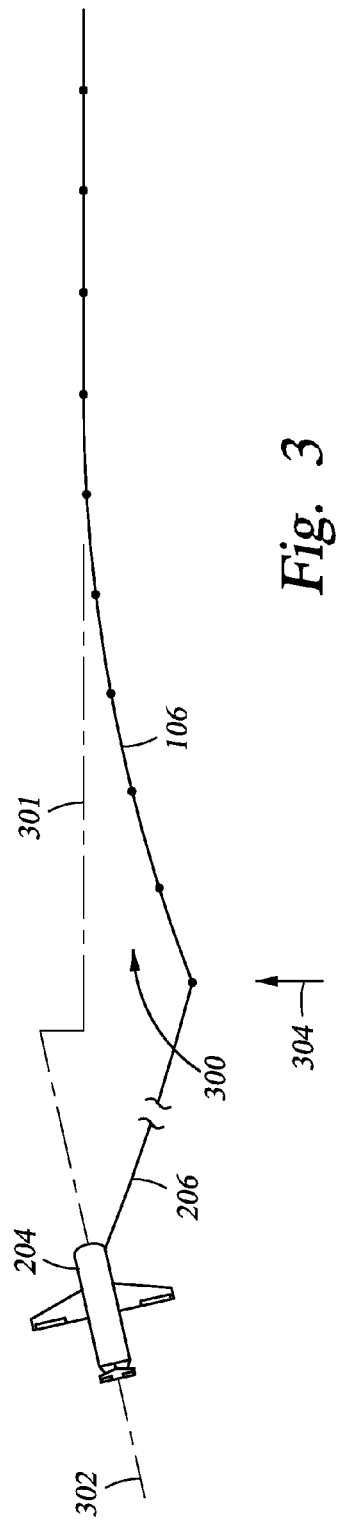
FIG. 3 shows a partial overhead view of a marine survey, showing steering of the sensor streamer by the tail buoy, in accordance with at least some embodiments.

In addition to the ability to selectively submerge, a tail buoy 204 in accordance with various embodiments may also change its heading through the water in order to fully or partially steer the distal end of the sensor streamer 106. FIG. 3 shows an overhead view of single sensor streamer 106 and tail buoy 204 in order to more fully describe the effects of the steering. In particular, FIG. 3 shows sensor streamer 106 with a deviation 300 from a desired course 301 (dashed lines). The deviation may be caused by a variety of factors, such as cross-currents in the water within which the marine survey is taking place. FIG. 3 also shows tail buoy 204 with a heading 302 (shown in dash-dot-dash line) that tends to pull or steer the sensor streamer 106. More particularly, the tail buoy 204 exerts a force in the direction indicated by arrow 304 (the force on the streamer exerted by way of the dead section 206). The force 304 thus tends to move the sensor streamer 304 in the direction of the force, and in this illustrative case toward the desired course 301.

The various angles and relationships in FIG. 3 may be exaggerated for purposes of explanation. The sensor streamer 106 may be from less than 2000 to in excess of 12000 meters in length in some cases, and thus relatively small angle deviations may result in the distal end of a sensor streamer being tens of meters off the desired track. Moreover, as mentioned above the dead section 206 may be in the range of 50 to 250 meters and length, and in operation (i.e., as the sensor streamer 106 is towed through the water) the actual amount of deviation of the tail buoy 204 during the steering maneuver may be relatively small, in some cases from three to five degrees measured from a central axis of the sensor streamer. Nevertheless, the amount of horizontal or lateral force the tail buoy 204 can supply, possibly in combination with steering mechanisms directly coupled to the sensor streamer 106, may be sufficient to cause and/or correct a change in track of the sensor streamer 106.

Figure 4:
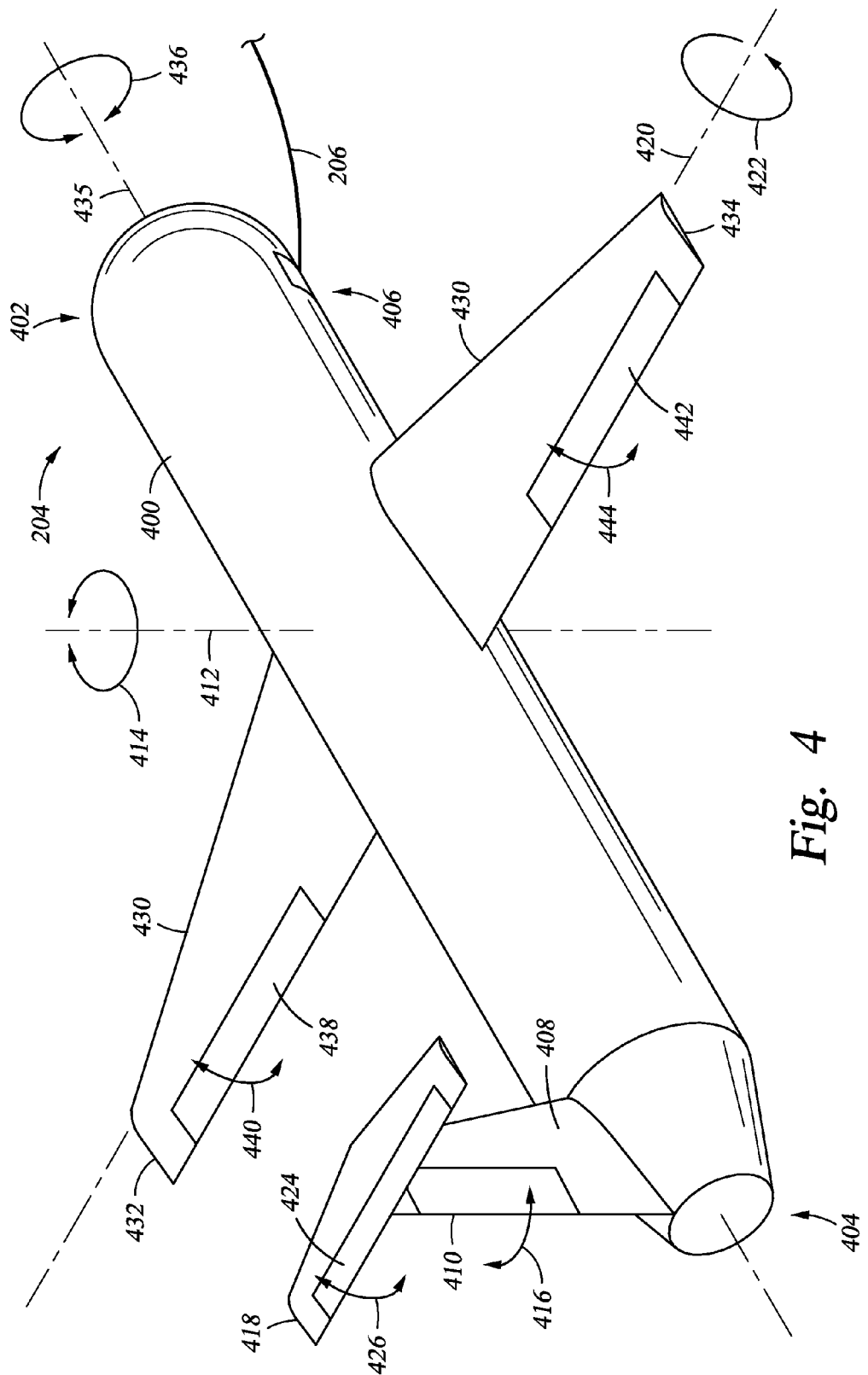
FIG. 4 shows a perspective view of a tail buoy in accordance with at least some embodiments.

FIG. 4 shows a perspective view of a tail buoy 204 in accordance with at least some embodiments. In particular, the tail buoy 204 comprises an elongated outer body 400 that defines a forward portion 402 and an aft portion 404. The elongated outer body may define a circular cross-section as illustrated, but other cross-sectional shapes may be used. The forward portion 402 is shown rounded to present an efficient hydrodynamic shape (i.e., to reduce drag), but other shapes for the forward portion 402 may be used. A tow point 406 is coupled to the elongated outer body 400, and as illustrated the tow point 400 may be coupled to the forward portion 402. The tow point 406 may be the location at which the line 206 is coupled. Other tow points disposed at other locations on tail buoy 204 may also be used. Illustrative tail buoy 204 may further comprise a vertical stabilizer 408 and rudder 410 within the vertical stabilizer 408. Vertical stabilizer is labeled "vertical" because of its illustrative orientation. When the tail buoy 204 is towed through water, the vertical stabilizer 408 acts to stabilize the yaw (i.e., rotation about a vertical axis 412, the rotation illustrated by double-headed arrow 414). Rudder 410 may be deflected, as illustrated by double-headed arrow 416. Deflection of rudder 410 results in forces tending to change the yaw of the tail buoy 204, and thus change the heading of the tail buoy 204 (e.g., to exert forces to steer an attached sensor streamer). Although illustrative FIG. 4 shows a separate vertical stabilizer 408 and rudder 410, in some cases the vertical stabilizer and rudder are the same structure, with deflection of the entire structure developing the forces tending to change the yaw of the tail buoy 400. For example, the entire vertical stabilizer may rotate about a vertical axis.

The illustrative tail buoy 204 also has a horizontal stabilizer 418, illustratively shown coupled on a distal end of the vertical stabilizer 408. In other embodiments, the horizontal stabilizer 418 may couple at the proximal end of the vertical stabilizer (i.e., closer to the elongated outer body 400), or may couple directly to the elongated outer body 400. Horizontal stabilizer 418 is labeled "horizontal" because of its illustrative orientation. When the tail buoy 204 is towed through water, the horizontal stabilizer 418 acts to stabilize the pitch (i.e., rotation about the horizontal axis 420, the rotation illustrated by double-headed arrow 422). In some cases, the horizontal stabilizer may be a solid structure (implementing no changes in pitch); however, in yet still further embodiments the horizontal stabilizer 418 comprises a control surface 424 which may be deflected, as illustrated by double-headed arrow 426. Deflection of control surface 424 results in forces tending to change the pitch of the tail buoy 204, which may result in a change in depth of the buoy 204. Although illustrative FIG. 4 shows a separate horizontal stabilizer 418 and control surface 424, in some cases the horizontal stabilizer and control surface are the same, with deflection of the entire structure developing the forces tending to change the pitch. For example, the entire horizontal stabilizer may rotate about a horizontal axis.

The horizontal stabilizer 418 may be omitted in some embodiments. Changes in pitch may also be implemented by changing buoyancy of the tail buoy 204. For example, making the forward portion 402 more positively buoyant than the aft portion 404 may result in pitch-up orientation. Likewise, making the aft portion 404 more positively buoyant than the forward portion 402 may result in pitch-down orientation. In other cases, the control system for the tail buoy 204 (the control system discussed below) may simultaneously control buoyancy and deflection of the control surface 426 to implement pitch changes.

Still referring to FIG. 4, the illustrative tail buoy 204 further comprises a set of wings 430 coupled to and extending away from the elongated outer body 400. In particular, the set of wings 430 comprises a port wing 432 and a starboard wing 434. When the tail buoy 204 is towed through water, the set of wings 430 acts to stabilize the roll (i.e., rotation about the long axis 435, the rotation illustrated by double-headed arrow 436). In some cases, the wing 432 and 434 may be a solid structure (implementing no changes in roll); however, in yet still further embodiments the each wing of the set of wings 430 comprises a control surface which may be deflected. For example wing 432 may implement control surface 438 whose deflection is illustrated by double-headed arrow 440, and wing 434 may implement control surface 442 whose deflection is illustrated by double-headed arrow 444. Deflection of the control surfaces results in a change in lift of the respective wing, and thus (when deflected oppositely) may result in forces tending to change the roll of the tail buoy 204. Although illustrative FIG. 4 shows separate wings 432, 434 and control surfaces 440, 442 respectively, in some cases the wings and control surface the same, with deflection of the entire wing developing the forces tending to change the roll. For example, the wings may rotate (oppositely) about horizontal axis 420, which may result in a change in roll.

In one embodiment, each wing defines a cross-section in the form of a symmetric airfoil. In the case of a symmetric airfoil, water flow over and under the wing experiences the same travel distance, and thus while providing a stabilizing force, no net lift is created. In yet still other embodiments, each wing defines a cross-section in the form of a non-symmetric airfoil. In the case of a non-symmetric airfoil, water flow over and under the wing experience different travel distance, and the faster path results in lower pressure (Bernoulli's principle) and thus lift is created (assuming the longer distance is over the upper surface) where the net lift force is roughly parallel to the vertical central axis 412.

Implementing the set of wings 430 as non-symmetric airfoils, thereby creating lift as the tail buoy 204 is towed through the water, enables several operational modes. In some cases, the lift provided may help support the attached sensor streamer. That is, the lift may provide the lifting force without, or with reduced, reliance on the buoyancy of the tail buoy 204. Moreover, when roll changes are implemented, the horizontal component of the lift force developed may assist in turning the tail buoy 204 (possibly in combination with the rudder 410 deflection), thus increasing the amount of force the tail buoy 204 can impart to the sensor streamer by way of the line 206.

The force developed by the set of wings 430 having a non-symmetric airfoil shape need not be a lifting force in all cases. In other embodiments, the longer path length may be under the wing, such that the force developed by water flow relative to the set of wings 430 may result in a force tending to submerge the tail buoy 204. That is, in some embodiments the tail buoy 204 may be configured to be positively buoyant, thus floating at the surface when not being towed. However, when the tail buoy is towed, the force developed by water flow relative to the set of wings 430 may tend to submerge the tail buoy 204.

Figures 5, 6:
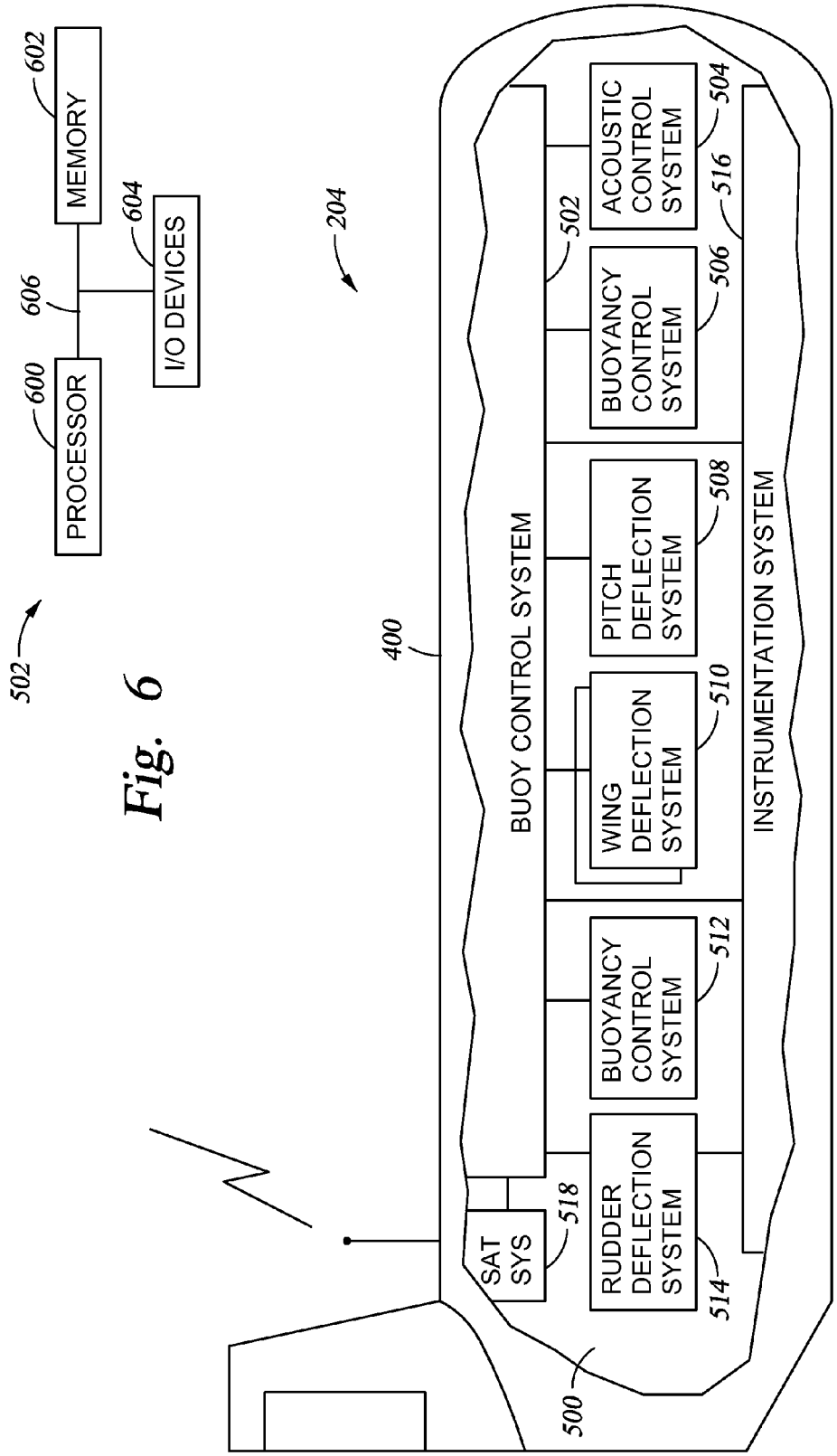
FIG. 5 shows a side elevation, partial cutaway and block diagram, view of a tail buoy in accordance with at least some embodiments.
FIG. 6 shows a computer system in accordance with at least some embodiments.

FIG. 5 shows a side elevation view, with partial cutaway, to show internal components (in block diagram form). In particular, FIG. 5 shows that the elongated outer body 400 may define an interior volume 500. Within the interior volume 500 may reside a buoy control system 502 coupled to: an acoustic communication system 504 ("acoustic com system"); a front buoyancy control system 506; a pitch deflection system 508; a wing deflection system 510; an aft buoyancy control system 512; a rudder deflection system 514; an instrumentation system 516; and a satellite communication system ("Sat Sys") 518. Each of the coupled systems may reside at least partially within the interior volume 500. The acoustic communication system 504 may be used to receive commands (e.g., commands to submerge, surface, or to steer an attached sensor streamer). In some cases, the buoy control system 502 may also communicate with other vessels (e.g., the tow vessel) by way of the acoustic communication system.

The buoy control system 502 further illustratively couples to the forward buoyancy control system 506 and aft buoyancy control system 512. Thus, the buoy control system 502 may command the buoyancy control system 506 and 512 to implement desired changes in buoyancy. Each buoyancy control system 506 and 512 sets the buoyancy of the respective portion of the tail buoy 204. In some cases, the buoyancy control systems 504 and 512 can be operated in unison, which may result in changes of depth without resulting in substantial pitch changes. In other cases, the buoyancy control systems may be operated at different rates, or resulting in opposite changes in buoyancy, to implement or assist in implementing pitch changes of the tail buoy 204. The buoyancy control implemented by the buoyancy control systems 504 and 512 may take any suitable form. In some cases, buoyancy control is implemented by way of a piston and cylinder arrangement, wherein when the piston moves in one direction a gas is compressed and water enabled to enter the interior volume, and when the piston moves in the opposite direction water is displaced from the interior volume 500. Other suitable mechanisms, such as water pumps and ballast systems, may be used. The buoyancy control implemented by the forward buoyancy control system 506 need not be the same as that implemented by the aft buoyancy control system 512.

Still referring to FIG. 5, the buoy control system 502 is operatively coupled to the pitch deflection system 508. The pitch deflection system 508 enables changes in control surface 424 of the horizontal stabilizer 418. The pitch deflection system 508 may take any suitable form, such as wires or ropes mechanically coupled to a deflection member, such as motor or piston.

The buoy control system 502 is operatively coupled to the wing deflection system 510. In some cases, a single wing deflection system 510 may be present, which simultaneously and oppositely operates both control surfaces 438 and 442. In other cases, the control surfaces may be independently operated by way of distinct wing deflection systems. The wing deflection system 510 may take any suitable form, such as wires or ropes mechanically coupled to a deflection member, such as motor or piston.

The buoy control system 502 is operatively coupled to the rudder deflection system 514. The rudder deflection system 514 enables changes in rudder 410 position. The rudder deflection system 514 may take any suitable form, such as wires or ropes mechanically coupled to a deflection member, such as motor or piston.

Still referring to FIG. 5, the buoy control system 502 may further be operatively coupled to instrumentation system 516. The composition of the instrumentation system 516 may take many forms. In some cases, the instrumentation system 516 may comprise an inertial navigation system. That is, during periods of time when the tail buoy 204 is submerged and being towed through the water, the instrumentation system 516 in the form of an inertial navigation system may estimate the track of the tail buoy (e.g., using devices such as accelerometers, inclinometers, and/or directional gyros). The estimated track created by the instrumentation system 516 in the form of an inertial navigation system may be useful not only with respect to knowing the location at various points in time of the attached sensor streamer, but also may be useful with respect to steering the attached sensor streamer. In some cases, the instrumentation system 516 in the form of an inertial navigation system creates the estimated track, and then sends the estimated track to a surface computer by any suitable means, such as the acoustic communication system 504, or the satellite communication system 518 when the tail buoy is at the surface of the water. That is, the estimated track may be encoded in electromagnetic radiation and sent to a surface computer during periods of time when tail buoy 204 is on the surface.

The instrumentation system 516 is not limited to just an inertial navigation system. Other types of instrumentation may be used in place of, or in addition to, an inertial navigation system. For example, the instrumentation system 516 may comprise sensors to read the salinity and temperature of water surrounding the tail buoy 204. In other cases, the instrumentation system 516 may comprises devices complementary to the marine survey, such as bottom profilers for reading the topography of the ocean bottom below tail buoy, and magnetometers for reading changes in magnetic field.

The body of the tail buoy 204 may be constructed of any suitable material. In some cases the tail buoy is constructed of a plastic material, perhaps over a rigid internal metallic structure (e.g., aluminum). In other cases, the tail buoy 204 may be constructed of self supporting material, such as a carbon composite material or fiberglass, such that no internal structure is needed. In yet still further cases, the tail buoy 204 may be constructed of metallic material (e.g., steel, aluminum, or alloys). Further still, the body of the tail buoy 204 may made from combinations of different material for different parts of the buoy (e.g., the elongated outer body constructed from one material, and the wings and stabilizers constructed from a different material).

In accordance with at least some embodiments, the buoy control system 502 is a computer system executing a program. FIG. 6 shows an electrical block diagram of buoy control system 502 in accordance with at least some embodiments. In particular, the buoy control system 502 comprises a processor 600 coupled to a program storage memory 602 and input/output devices 604 by way of one or more communication buses 606. The processor 600 may take any suitable form, and depending on the amount of processing power used by the buoy control system, the processor 600 may be multiple processors, or processors with multiple cores. In other cases, particularly cases where the buoy control system 502 operates on a limited energy supply like a battery, the processor 600 may be a processor with limited processing capability, and implementing various power saving features (e.g., sleep modes, reduced power operational states).

The program storage memory 602 may take any suitable form, such as random access memory (RAM), read only memory (ROM), or a long term storage device (e.g., flash memory, hard disk drive). The program storage memory 602, which is an example of a non-transitory computer-readable medium, may thus store programs executed by the processor 600 to implement the various embodiments discussed above. The I/O devices 604 likewise may take any suitable form, such as parallel communication ports, serial communication ports, analog input ports, analog output ports, digital input ports, and digital output ports.

In some cases, the buoy control system 502 may be implemented as individual processor 600, program storage memory 602, and I/O devices 604; however, in yet still other embodiments the processor, memory and I/O functionality may be implemented by way of an integrated unit, such as a microcontroller available from any suitable source.

Figure 7:
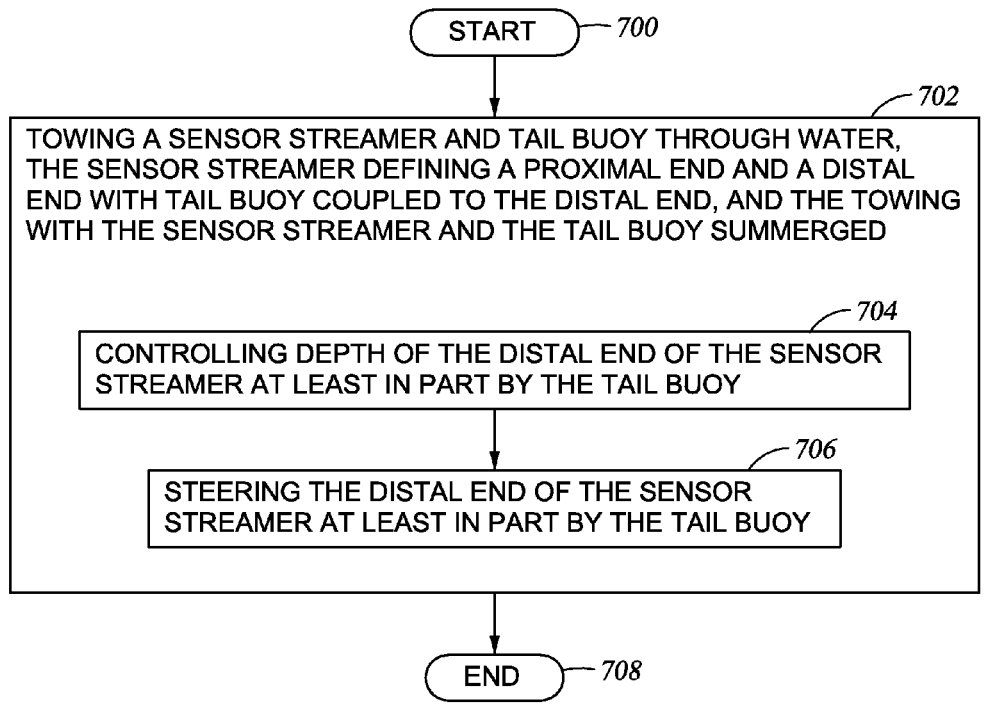
FIG. 7 shows a method regarding towing a sensor streamer in accordance with at least some embodiments.

FIG. 7 shows a method in accordance with at least some embodiments. In particular, the method starts (block 700) and comprises towing a sensor streamer and tail buoy through water, the sensor streamer defining a proximal end and a distal end with the tail buoy coupled to the distal end, and the towing with the sensor streamer and the tail buoy submerged (block 702). During the towing, the method further comprises: controlling depth of the distal end of the sensor streamer at least in part by the tail buoy (block 704); and steering the distal end of the sensor streamer at least in part by the tail buoy (block 706). Thereafter, the method ends (block 708), in some cases to be repeated.

Figure 8:
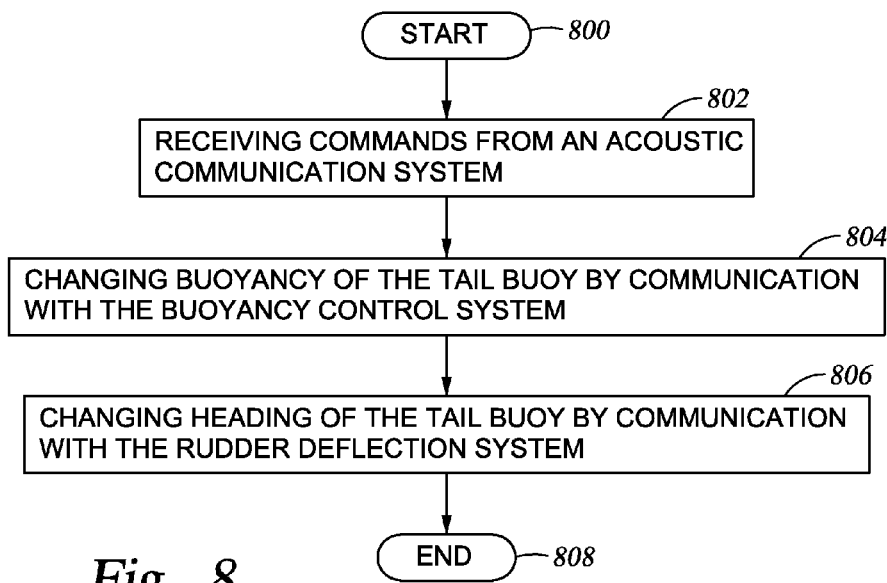
FIG. 8 shows a method regarding control of a tail buoy in accordance with at least some embodiments.

FIG. 8 shows a method that may be implemented by way of software. In particular, the method starts (block 800) and comprises: receiving commands from an acoustic communication system (block 802); and responsive to the commands changing buoyancy of the tail buoy by communication with the buoyancy control system (block 804); and changing heading of the tail buoy by communication with the rudder deflection system (block 806). Thereafter the method ends (block 808), in some cases to be repeated.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, while no specific power source is discussed, the power source for the tail buoy could take many suitable forms, such as batteries, and/or electrical generators that produce power based on relative water flow past the tail buoy. It is intended that the following claims be interpreted to embrace all such variations and modifications.

What is claimed is:

1. A tail buoy comprising:
an elongated outer body defining a forward portion, an aft portion, an interior volume, and a central axis;
a tow point coupled to the elongated outer body on the forward portion;
a rudder coupled to and extending away from the elongated outer body;
a rudder deflection system disposed at least partially within the elongated outer housing, the rudder deflection system operatively coupled to the rudder and configured to selectively deflect the rudder;
a set of wings coupled to and extending away from the elongated outer body, the set of wings comprising a first wing and a second wing;
a first control surface associated with the first wing, the first control surface configured to change lift of the first wing;
a second control surface associated with the second wing, the second control surface configured to change lift of the second wing;
a first stabilizer disposed proximate the aft portion of the elongated outer body, at least a portion of the first stabilizer configured to deflect to cause changes in pitch of the elongated outer body;
a buoyancy control system disposed at least partially within the interior volume, the buoyancy control system configured to selectively set buoyancy of the tail buoy at a value within a range of values between positively buoyant and negatively buoyant;
an acoustic communication system disposed at least partially within the interior volume and configured to receive messages from a remote device by way of pressure waves in water;
a buoy control system disposed at least partially within the elongated outer body, the buoy control system operatively coupled to the rudder deflection system, the buoyancy control system, and the acoustic communication system, the control system comprising:
a processor; and
a memory coupled to the processor;
wherein the memory stores a program that, when executed by the processor causes the processor to:
receive commands from the acoustic communication system; and responsive to the commands
change buoyancy of the tail buoy by communication with the buoyancy control system; and
change heading of the tail buoy by communication with the rudder deflection system.

2. The tail buoy of claim 1 wherein the processor is configured to submerge the tail buoy by changing buoyancy of the tail buoy.

3. The tail buoy of claim 1 wherein the processor is configured to change depth of the tail buoy by changing buoyancy of the tail buoy.

4. The tail buoy of claim 1 further comprising:
a first deflection control system operatively coupled to the first control surface, the first deflection control system configured to selectively deflect the first control surface, and the first deflection control system communicatively coupled to the buoy control system;
a second deflection control system operatively coupled to the second control surface, the second deflection control system configured to selectively deflect the second control surface, and the second deflection control system communicatively coupled to the buoy control system;
wherein the program is configured to cause the processor to change heading of the tail buoy by communication with the first and second deflection control system.

5. The tail buoy of claim 1 further comprising an inertial navigation system disposed at least partially within the elongated outer housing and communicatively coupled to the buoy control system, the inertial navigation system configured to estimate a track of the tail buoy when submerged.

6. The tail buoy of claim 5 further comprising a satellite communication system disposed at least partially within the elongated outer housing and communicatively coupled to the buoy control system, the satellite communication system configured to transmit the estimated track when the tail buoy is at the surface.

7. The tail buoy of claim 1 wherein the cross-sectional shape of the first wing and the second wing are each a non-symmetric airfoil.

8. The tail buoy of claim 7 wherein the cross-sectional shape of the first and second wings are configured to provide a force tending to submerge the tail buoy as the tail buoy is towed through the water.

9. The tail buoy of claim 8 wherein the tail buoy is positively buoyant.

10. The tail buoy of claim 7 wherein cross-sectional shape of the first and second wings are configured to provide a force tending to cause the tail buoy to surface as the tail buoy is towed through the water.

11. The tail buoy of claim 1 further comprising a sensor at least partially disposed within the elongated outer body, the sensor configured to read salinity of water proximate the tail buoy.

12. The tail buoy of claim 1 further comprising a sensor at least partially disposed within the elongated outer body, the sensor configured to read temperature of water proximate the tail buoy.

13. The tail buoy of claim 1 further comprising a bottom profiler at least partially disposed within the elongated outer body, the bottom profiler configured to read topography of an ocean bottom beneath the tail buoy.

* * * * *